United States Patent
Belenkii et al.

(10) Patent No.: US 8,471,906 B2
(45) Date of Patent: *Jun. 25, 2013

(54) MINIATURE CELESTIAL DIRECTION DETECTION SYSTEM

(75) Inventors: Mikhail Belenkii, San Diego, CA (US); Donald Bruns, San Diego, CA (US); Timothy Brinkley, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 612 days.

This patent is subject to a terminal disclaimer.

(21) Appl. No.: 12/583,776

(22) Filed: Aug. 25, 2009

(65) Prior Publication Data

US 2010/0283840 A1    Nov. 11, 2010

Related U.S. Application Data

(63) Continuation-in-part of application No. 11/604,133, filed on Nov. 24, 2006, now abandoned, and a continuation-in-part of application No. 12/283,785, filed on Sep. 15, 2008, now abandoned.

(51) Int. Cl.
*H04N 7/18* (2006.01)
(52) U.S. Cl.
USPC ......................................... 348/144; 348/208

(58) Field of Classification Search
USPC .................................................. 348/144, 208
See application file for complete search history.

(56) References Cited

U.S. PATENT DOCUMENTS

| | | | | |
|---|---|---|---|---|
| 4,472,144 | A * | 9/1984 | Mantley | 434/106 |
| 5,510,933 | A * | 4/1996 | Bullers, Sr. | 359/430 |
| 5,682,332 | A * | 10/1997 | Ellenby et al. | 345/633 |
| 5,902,351 | A * | 5/1999 | Streit et al. | 701/446 |
| 7,798,264 | B2 * | 9/2010 | Hutcheson et al. | 180/65.1 |
| 7,873,490 | B2 * | 1/2011 | MacDonald | 356/218 |
| 2010/0061593 | A1 * | 3/2010 | MacDonald et al. | 382/103 |

* cited by examiner

*Primary Examiner* — Phuoc Nguyen
(74) *Attorney, Agent, or Firm* — John R. Ross

(57) ABSTRACT

A celestial direction finding system. The system includes an inclinometer, at least one camera for imaging both the daytime sky and the nighttime sky and a computer programmed with a sun, moon and star catalog and algorithms for automatically determining directions based on positions of celestial bodies imaged by at least one camera and incline positions measured by the inclinometer. In a preferred embodiment all of the above features are combined in a single battery operated miniature celestial direction finding module. Geographical positions of nearby objects can be determined with the addition of a rangefinder and knowledge of the geographical position of the camera. The geographical position of the system in preferred embodiments can be determined with the addition of a GPS unit.

17 Claims, 6 Drawing Sheets

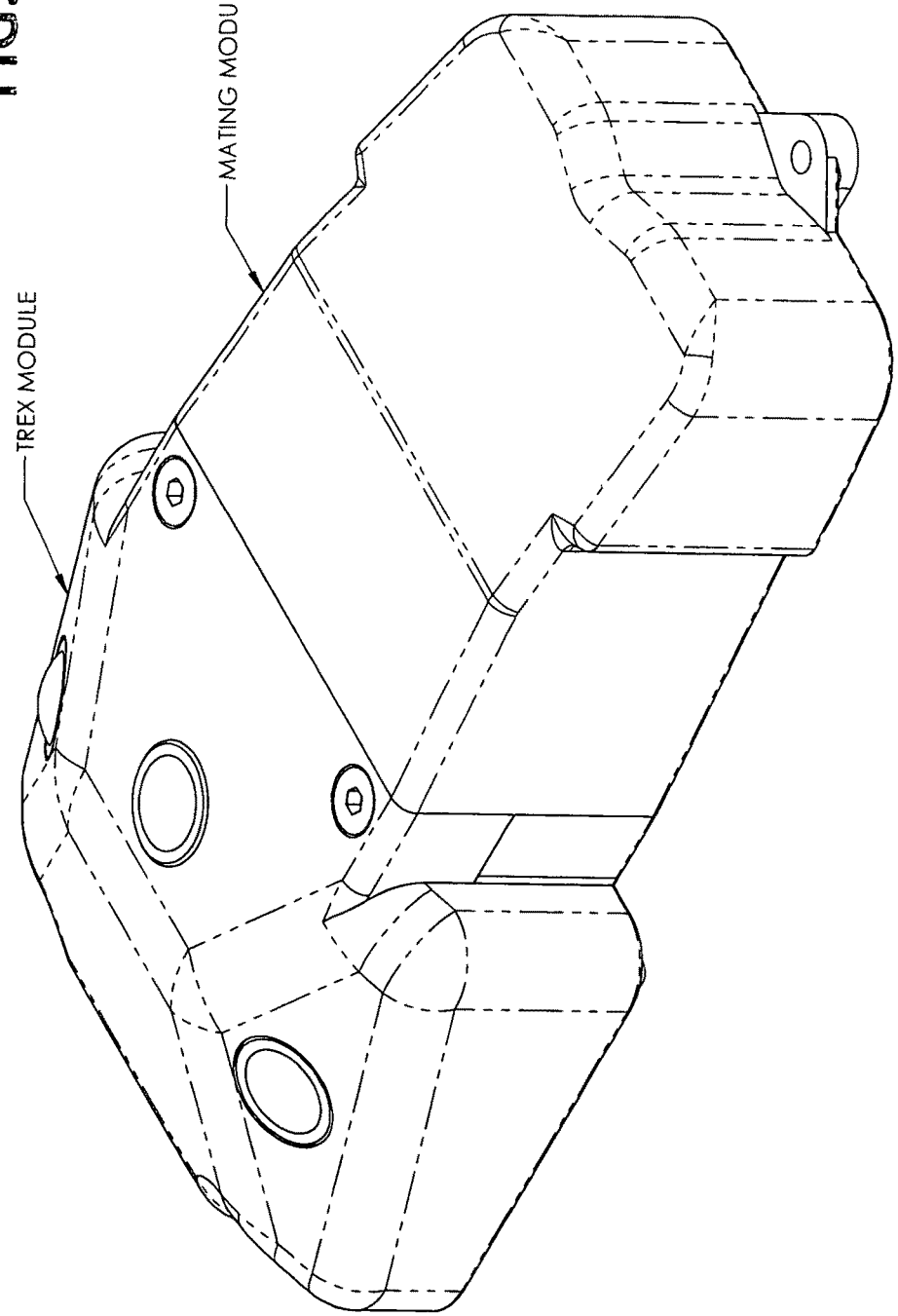

MINIATURE CELESTIAL DIRECTION DETECTION SYSTEM

CROSS REFERENCE TO RELATED APPLICATIONS

This application is a continuation in part of patent application Ser. No. 11/604,133, Celestial Compass, filed Nov. 24, 2006 and Ser. No. 12/283,785, Portable Celestial Compass filed Sep. 15, 2008.

FEDERAL SUPPORTED RESEARCH

The present invention was made in the course of work under contract number N00178-08-C-0019 with the United States Navy and the United States Government had rights in the invention.

FIELD OF INVENTION

The present invention relates to direction detection systems, especially to such systems designed for use in determination of precise locations of targets.

BACKGROUND OF THE INVENTION

Theodolites

A theodolite is and instrument for measuring both horizontal and vertical angles. In modern theodolites, the reading out of the horizontal and vertical circles is usually done electronically. The readout is done by a rotary encoder, which can be absolute, e.g. using Gray codes, or incremental, using equidistant light and dark radial bands. In the latter case the circles spin rapidly, reducing angle measurement to electronic measurement of time differences. Many modern theodolites, costing up to $10,000 apiece, are equipped with integrated electro-optical distance measuring devices, generally infrared based, allowing the measurement in three-dimensional vectors. Typically, ruggedized laptops or personal digital assistances (PDA's) are used as data collectors for this purpose.

Binoculars for Target Identification

The Victor 21 binoculars, available off-the-shelf from Vertronix with offices in Heersbrugg, Switzerland are stabilized by a precision miniature gyroscope mounted on a gimbaled platform in the middle of the optical pathway. A gyro stabilized binocular rejects almost all image motion caused by hand tremor and platform vibration. It has a 7× magnification and stabilization freedom of ±8 degree. A laser range finder uses a miniature eye safe laser, which is capable of sending a beam out to several kilometers and it provides good signal-to-noise ratio without placing a high burden on the power supply. The laser rangefinder has an accuracy of ±2 m at 5 km range. For target identification and location the Victor 21 binoculars can are equipped with a digital magnetic compass and co-located with a GPS unit. The digital magnetic compass mounted on the binoculars provides an azimuth and elevation angle (in digital format) of the binocular pointing direction and the laser range finder provides the range to the target, all relative to the location of the binoculars and the GPS unit provides the location of the binoculars in latitude and longitude. Existing computer software is available for quickly determining the latitude, longitude and elevation (above sea level) of the target from a combination of the information provided by the digital magnetic compass, the range finder and the GPS unit.

Sky Charts

The position of celestial objects at any time at any place on earth is known with extremely high accuracy. These celestial objects include all recognizable stars and planets, the sun and the moon. Celestial objects also include visible man-made satellites. Accurate positioning of the celestial objects depends only on knowledge of the latitude and longitude position and on the date and the time to within about 1 to 3 seconds of observation. Latitude and longitude generally can be determined easily with precision of less than one meter with available maps or with global positioning equipment. Computer programs with astronomical algorithms are available that can be used to calculate the positions of any of these celestial objects at any time for any position on or near the surface of the earth. Star pattern recognition computer programs are available in the prior art. These computer programs are described in several good text books including *Astronomical Algorithms* by Jean Meeus, published by Willmann-Bell with offices in Richmond Va. Techniques for using the programs to determine the positions of the celestial objects are clearly described in this reference. Programs such as these are used to provide planetarium programs such as "The Sky" available from Software Bisque and "Guide" available from Project Pluto.

Fisheye Lenses

Fisheye lenses are lenses with a highly curved protruding front that enables it to cover a solid angle of about 180 degrees. The lenses provide a circular image with barrel distortion.

Locating a Target

The precise location of a target, relative to an observation position on or near the surface of the earth can be made with the measurement of three coordinates (elevation, azimuth and range):
1) elevation (typically the angle, with respect to the vertical from the observation position, of the direction to the target),
2) azimuth (typically the angle, with respect to a reference direction (such as north) from the observation position, of the horizontal direction to the target), and
3) range (the distance from the observation position to the target).

MEMS Inclinometers

Vertical at the observation position can easily be found by using an inclinometer. Tiny MEMS type inclinometers (such as Analog Devices ADIS 162097) with accuracies better than 2 milliradians are available from suppliers such as Jewell Instruments with offices in Manchester, N.H. The cost of these inclinometers typically is in the range of about $2,000.

Laser Rangefinders

Range can be determined with a laser rangefinder. Laser rangefinders with accuracies in the range of about 1 meter are available from suppliers such as Raytheon and the cost of these instruments is in the range of about $5,000.

Magnetic Compasses

Magnetic compasses are typically accurate to only one degree, and the presence of steel or other local disturbances will often reduce accuracy of the magnetic compasses to several degrees or render them useless. Therefore, if positioning of a target depends on the use of a magnetic compass, substantial position errors could likely result. In the case of military operations, the accuracy of current and future fire support systems strongly depends on the errors in target coordinates called target localization error (TLE). In order to reduce collateral damage and improve target lethality, a TLE on the order, or less than, 10 meters at 5 km range is needed. Current target localization technology does not meet this standard. The main source of error is magnetic compasses. Commonly a ground-based observer determines target coordinates using a laser rangefinder, GPS receiver, and magnetic compass. Measurement error of a magnetic compass typically is 10-17 milliradians. This corresponds to the TLE of 50-85 meters at a 5 km range. In many situations knowledge of the true azimuth to a target with precision of much better than 1 degree is needed. Also magnetic compasses are highly sensitive to random errors caused by weakly magnetic disturbances (e.g. vehicles, buildings, power lines etc.) and local variations in the earth's geo-magnetic field. These error sources are random and cannot be accurately calibrated and modeled to subtract out. A large magnetic disturbance from hard or soft iron effects can result in target accuracy errors of up to 30 to 60 degrees.

Attitude Heading and Reference Systems

Attitude heading reference systems (AHRS's) are 3-axis sensors that provide heading, attitude and yaw information for aircraft. AHRS's are designed to replace traditional mechanical gyroscopic flight instruments and provide superior reliability and accuracy. These systems consist of either solid-state or MEMS gyroscopes, accelerometers and magnetometers on all three axes. Some of these systems use GPS receivers to improve long-term stability of the gyroscopes. A Kalman filter is typically used to compute solutions from these multiple sources. AHRS's differ from traditional inertial navigation systems (INS's) by attempting to estimate only attitude (e.g. pitch, roll) states, rather than attitude, position and velocity as is the case with an INS.

AHRS's have proven themselves to be highly reliable and are in common use in commercial and business aircraft. Recent advances in MEMS manufacturing have brought the price of Federal Aviation Administration certified AHRS's down to below $15,000.

The Need

What is needed is a miniature device that can provide an azimuth reference accurate to within about 1/10th to 1/20th of a degree.

SUMMARY OF THE INVENTION

The present invention provides a miniature celestial direction detection system. The system includes an inclinometer, at least one camera for imaging at least one celestial object and a processor programmed with a celestial catalog providing known positions at specific times of at least one celestial object and algorithms for automatically calculating target direction information based on the inclination of the system as measured by the inclinometer and the known positions of the celestial object as provided by the celestial catalog and as imaged by the camera.

In a preferred embodiment the processor is a microprocessor and the celestial catalog includes known positions (as a function of time) of the sun, the moon and a large number of stars. This embodiment includes three cameras. A daytime camera with a fisheye lens is used to image the sun and a nighttime cameras is used to image the moon and stars. The system is mounted on line of sight stabilized binoculars equipped with a laser range finder and a GPS unit is co-located with the system. In use the binoculars are directed by an operator at a target and a signal representing the range to the target is provided to the processor by the range finder. Celestial image information is provided to the processor by at least one of the cameras and the inclination of binoculars and the system is provided to the processor by the inclinometer. The GPS unit provides information representing the latitude, longitude and elevation above sea level of the system. The microprocessor utilizes the provided information to determine range, azimuth and elevation directions to the target. The information is displayed locally and may be transmitted to interested persons at a distant location. Using this information along with latitude, longitude and elevation above sea level the latitude, longitude and elevation of the target can easily be determined with precision substantially better than prior art systems utilizing magnetic compasses for measuring azimuth and elevation direction to the target.

Other applications of the present invention include high accuracy directional equipment for surveying, cruise ships, fishing boats and private and commercial aircraft and UAV's. A miniature attitude and reference system such as the systems discussed in the background section of this specification may be added to allow the target information to be determined in the event that clouds obscure the celestial objects. Also at a particular location the precise direction to a local landmark can be identified by the system and utilized to provide reference directions later in the event of cloudy weather.

To prove the advantages of the present invention Applicants have actually built and successfully tested a two-camera prototype unit. This unit has been combined with an off-the-shelf military binocular unit (the Victor 21 stabilized binoculars) designed for use with a magnetic compass and a range finder for target localization. The binoculars include a line of sight stabilization feature to eliminate movement and jitter of the laser beam. Other telescopic instruments such as a telescope could be substituted for the binocular unit.

This embodiment basically supplements the magnetic compass to provide a much more accurate target designator. The prototype unit reduces the target localization error from about 10 to 17 milliradians (which corresponds to an error of 50 to 85 meters at 5 km) down to 1 milliradian, or 5 m at 5 km range. Hardware mounted on the binoculars consists of a daytime camera with a 180 degree fisheye lens (for viewing the sun), and a separate nighttime camera (for viewing stars and the moon) and a MEMS 2-axis inclinometer. The cameras and inclinometer were linked to a laptop computer which was used to record raw data (images, time and inclinometer readings) and provide almost real-time calculations. Time is provided by synchronizing the laptop computer to National Institute of Standards and Technology (NIST) Internet time using NIST Windows XP software (performed once per day). Geolocation is provided by GPS (several independent measurements). A laser rangefinder integrated with the binoculars, allowed the observer to measure the target range. By using celestial measurements, the combined system determined the target azimuth and elevation with a high degree of accuracy.

Thus, the system determines target coordinates (range, azimuth, and elevation) with respect to his own GPS coordinates. This information is easily converted to latitude, longitude and elevation of the target.

Applicants have also designed a preferred miniature celestial direction finding module that includes a single fish eye lens, a daytime movable filter, multi-million pixel sensor, a MEMS inclinometer, a microprocessor, a battery power supply and an LCD display. All of this is combined in a miniature 1.8 cubic inch package that is 1 inch×1 inch wide and 1.8 inches tall.

BRIEF DESCRIPTION OF THE DRAWINGS

FIG. 6 shows the FIG. 5 embodiment mated with a companion module containing a GPS unit, a digital magnetic compass and a inertial measurement unit.

DETAILED DESCRIPTION OF PREFERRED EMBODIMENTS

Single Camera System

Figure 3:
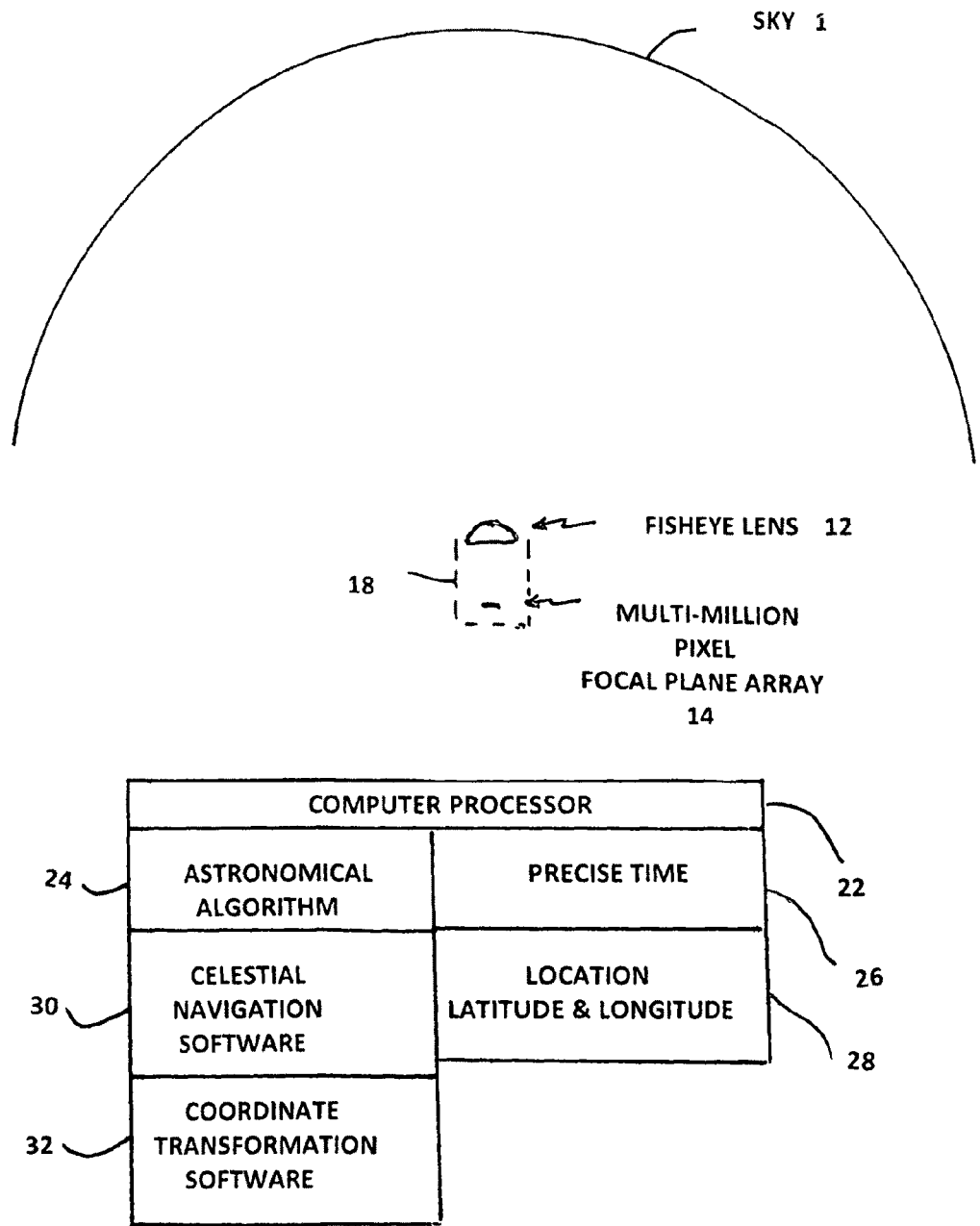
FIG. 3 is a drawing showing features of an earlier one camera prototype embodiment of the present invention.

A block diagram of a prototype of the present invention actually built and tested by Applicants is shown in FIG. 3. It is a celestial compass and includes a camera 18 having a fisheye lens 12 suitable for viewing almost an entire hemisphere of the sky and a 1.3-million pixel sensor 14 for collecting images of celestial objects such as stars, planets, the moon and the sun. The celestial compass also includes a computer 22 programmed with an astronomical algorithm for providing the precise position of celestial objects based on precise input of time (date and time of day, 26) and observation position (latitude and longitude, 28), celestial navigation software 30 and coordinate transformation software 32 for converting pixel image data into astronomical coordinates, and providing a true north reference.

The Camera

Figure 3A:
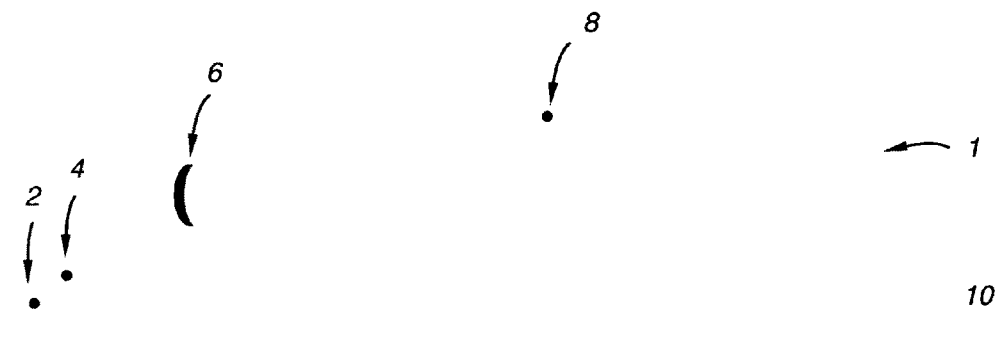
FIGS. 3A and 3B indicate how the night sky appears on the image of a camera fitted with a fisheye lens.
Figure 3A:
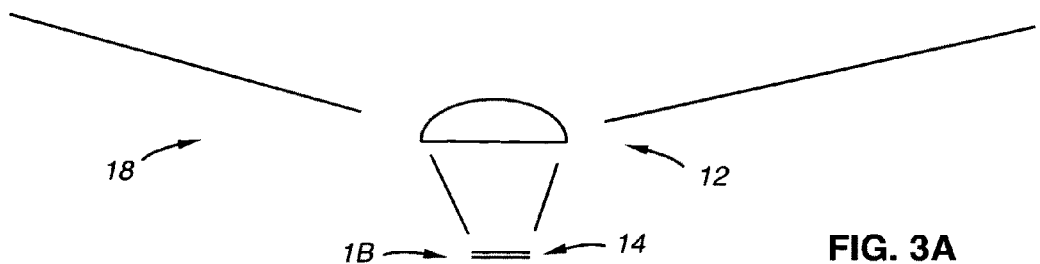
Figure 3B:
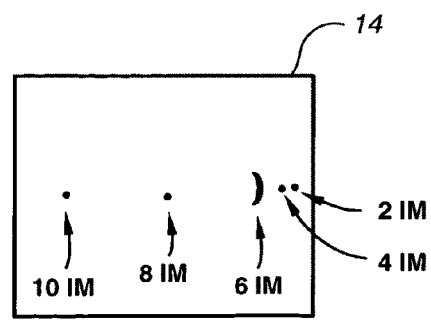

As shown in FIG. 3A about 170 degrees of a nighttime hemisphere 1 is viewed via a camera 18 with a fisheye lens 12 and a 1.3-million pixel sensor 14 at the focal plane of the camera. Applicants in this prototype used a Nikon fisheye 10.5 mm F/2.8 camera lens with a 3.75 mm aperture and a 1.3-million Micron camera available from Edmund Optics with offices in Barrington N.J. Shown in the nighttime hemisphere are the moon 6 and four stars 2, 4, 8 and 10. The moon and the stars are shown in a portion of the 1.3-million pixel image of the hemispheres in FIG. 1B at 6I, 2I, 4I, 8I, and 10I, respectively. First magnitude stars were visible with small centroid errors. Preferably an edge detection algorithm should be included in the computer software for precise location of the centroids of the sun and the moon.

Positions of celestial objects are known to very high precision, so the azimuth precision is limited mainly by the precision of the optics used to view them. A fisheye lens can view nearly an entire hemisphere. If such a lens is attached to a camera that is looking precisely in the vertical direction, then the sun, the moon, or some bright stars or planets will nearly always be visible except during periods of heavy cloud cover. The image formed by the lens will be captured by a high resolution digital camera, so that the location of the celestial target can be determined to high accuracy. In a test by Applicants, a fisheye lens connected to a camera with approximately 1.3 million pixels was able to provide target location accuracy more precise than ½oth degree. Determining the target centroid to less than one half of its diameter is possible if the signal to noise ratio is high enough. For bright celestial targets, this is normally true.

Correct for Camera Distortion

Converting the pixel location to celestial altitude is performed by measuring the distortion in the camera and using a pixel scale factor in degrees per pixel. To determine the accurate location of a small celestial target relative to the camera requires only a centroid measurement. To determine the accurate celestial location of the sun or moon requires finding the edges of the target and then calculating the true center based on the size and shape of the target at the time of the observation. The software for this conversion of image data into astronomical coordinates is indicated in FIG. 3 at 32. The software as indicated above must correct for the distortion of the wide angle lens while also converting image data into astronomical coordinates, preferably elevation and azimuth. Additional software details are provided in the section below describing a two-camera prototype embodiment.

Two-Camera Prototype Unit

Figure 1:
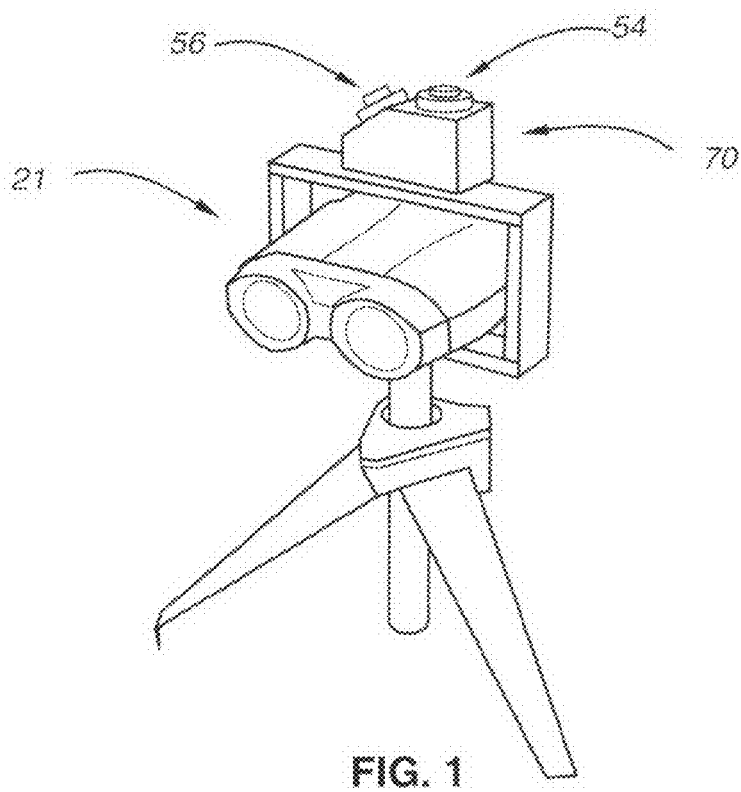
FIG. 1 is a drawing of a two camera prototype embodiment of the present invention utilizes in combination with a Victor 21 binoculars.

A two-camera prototype targeting system built and tested by applicants is shown in FIG. 1. The targeting system is built around stabilized Victor 21 binoculars (shown in FIG. 1 at 21). The Victor 21 binoculars are described in the background section. Attached to the binoculars was the two-camera prototype module 70 which included a MEMS inclinometer and two cameras, a first camera 54 having a fisheye lens and mounted to point in the vertical direction for daytime celestial observation typically using the sun and a second camera 56 having a smaller field of view lens (i.e. 66 degrees) for nighttime celestial observation typically using stars or the moon. This second camera is mounted to point at an angle perpendicular to the boresight of the binoculars and about 45 degrees from vertical. The cameras and the inclinometer are linked to a laptop computer which is used to record raw data (including images and inclinometer readings) and provide almost real time calculations. The computer is programmed with a star catalog and software for target azimuth/elevation determination and sight reduction software. Time is provided by synchronizing the laptop personal computer to NIST internet time using NIST WindowsXP software (performed once per day). Geo-location is preferably provided by GPS (several independent measurements). The system uses celestial objects (the sun, moon, bright stars or planets) with known position as absolute references for target azimuth and elevation measurements. Since the off-the-shelf binoculars included a 3-axis digital magnetic compass for target coordinates determination, the azimuth determinations from the celestial object could be cross checked with the digital magnetic compass values. The azimuth and elevation accuracy of the prototype system was 2 milliradians. The celestial measurement in general improved the accuracy of the pointing information by a factor of 5 to 8 as compared to relying on a magnetic compass for a horizontal reference. The prototype unit provides a new multi-functional capability for high precision target localization with the ability to perform the following tasks:

Stabilizes the line-of sight for reliable target identification;
Measures the target range with an accuracy of ±2 m at 5 km range;
Determines target azimuth and elevation with the accuracy of 0.1°, or 2 milliradians, using star measurements.

This embodiment was battery powered, portable, light weight, and low cost. The system was programmed to automatically determine target range, azimuth and elevation angle relative to the system location. Since the system location is known in latitude, longitude and elevation above sea level, the coordinates of latitude, longitude and elevation above sea level of the target can be easily calculated using existing software as explained in the background section.

Some parameters of interest for the daytime camera and its 180 deg fisheye lens are listed in Table 1.

TABLE 1

Camera, fisheye lens parameters.

Camera

| | |
|---|---|
| pixel size | 5.2 um |
| array size | 1024 × 1280 |
| bits/pixel | 8 |
| QE | ~typical CMOS monochrome |
| Frame rate | ~10 fps typical operation |

Fisheye

| | |
|---|---|
| f/# | 2 |
| Horiz field of view | 185 deg |

Outline of basic daytime algorithm processing steps:
1) Measure sun azimuth and zenith on the fisheye where radius to center is proportional to the zenith angle and azimuth is the angle between column offset and row offset from the center.
2) Mathematically rotate azimuth and zenith angle (small angle approximation) from sensor/fisheye frame to inclinometer frame (i.e. calibrate by determining fisheye boresight when inclinometer is zeroed).
3) Mathematically rotate azimuth and zenith from inclinometer frame to local horizon frame with unknown azimuth offset.
4) Determine azimuth offset by taking difference between measured azimuth (step 3) and known sun position (from time and position).
5) Mathematically rotate boresight pointing in inclinometer coordinates to local horizon coordinates (with unknown azimuth) using inclinometer measurements
6) Determine absolute azimuth of boresight by azimuth offset determined in step (4).

Calibration procedure: Reverse steps (5) and (6) above while siting targets with known absolute azimuth. The calibration procedure and the procedure for absolute target azimuth and zenith (elevation) angle determination is described below.

A brief description of variable notation is summarized in Table 2. The reader should note that all coordinate rotations are based on small angle approximations. This seems reasonable since all measurements of the optical axis offset from the inclinometer z-axis (zenith pointing for zero readings) show angles less than 10 milliradians. All measurements were based on objects with inclinometer pitch and roll readings less than 5 degrees.

The sun position on the sensor is determined by a center of mass calculation. A matched filter determines the location of the sun (not necessary simply finding the peak is sufficient). The background (+camera analog to digital bias) is determined as the average of a 32×32 pixel region centered on the peak and excluding the center 16×16 pixels. A center of mass calculation is made including only those pixels in the 16×16 region with signal exceeding 5% of the peak value.

The equations assume that the image distance from the optical axis on the sensor is a linear function of the zenith angle under the following additional assumptions:
1) Inclinometer axes are orthogonal. (Presumably determined by lithography/etch on MEMS since both axes were on a single die).
2) Row/column axes combined with fisheye boresight constitute an orthogonal coordinate system.

TABLE 2

Parameter Definitions (1) $(x_{s0}, y_{s0})$ = array center in pixels on sensor
(2) $\Delta x$ = angular pixel size
(3) $(\alpha_s, \beta_s)$ pitch and roll of fisheye optical axis with respect to inclinometer z-axis (zenith for leveled inclinometer)
(4) $(\gamma_b, \theta_b)$ = azimuth and zenith angle of binocular boresight in inclinometer reference frame.

Measured Quantities (1) $(x_s, y_s)$ = sun centroid on sensor
(2) $(\theta_x, \theta_y)$ = inclinometer measured pitch and roll.

Calculated Quantities (1) $(\gamma_s, \theta_s)$ = measured sun azimuth and zenith angle in sensor/fisheye frame
(2) $(\gamma_o, \theta_o)$ = measured sun azimuth and zenith angle in inclinometer frame
(3) $(\gamma_l, \theta_l)$ = measured sun azimuth and zenith angle in module based local horizon coordinates
(4) $\Delta\gamma_{sun}$ = yaw of module based local horizon coordinates relative to true local horizon coordinates (ENU).
(5) $\gamma_l'$ = absolute azimuth of the sun in local horizon coordinates (ENU) calculated based on solar ephemeris, time, and geo-location
(6) $\gamma_{bl}'$ = absolute azimuth of the target Detailed equations are set forth below:
Coordinate system for sun position analysis.
(1) Measure sun centroid $(x_s, y_s)$
(2) Azimuth and zenith angles in sensor coordinates $$\varphi_s = \tan^{-1}\left(\frac{y_s - y_{s0}}{x_s - x_{s0}}\right)$$

$$\theta_s = \Delta x \sqrt{(x_s - x_{s0})^2 + (y_s - y_{s0})^2}$$

(3) Rotate to optical axis $$\phi_o = \phi_s + (\beta_s \sin\phi_s + \alpha_s \cos\phi_s)\cot\theta_s$$

$$\theta_o = \theta_s + (-\beta_s \cos\phi_s + \alpha_s \sin\phi_s)$$

(4) Rotate to local horizon using inclinometer measurements, $(\theta_x, \theta_y)$ $$\phi_l = \phi_o - (\theta_y \sin\phi_o - \theta_x \cos\phi_o)\cot\theta_o$$

$$\theta_l = \theta_o + (\theta_y \cos\phi_o + \theta_x \sin\phi_o)$$

$$\Delta\phi_{sun} = \phi_l' - \phi_l$$

where $\phi_l'$ is the absolute azimuth of the sun.

(5) Rotate boresight to local horizon coordinates $$\phi_{bl} = \phi_b - (\theta_y \sin\phi_b - \theta_x \cos\phi_b)\cot\theta_b$$

$$\theta_{bl} = \theta_b + (\theta_y \cos\phi_b + \theta_x \sin\phi_b)$$

$$\phi'_{bl} = \phi_{bl} + \Delta\phi_{sun}$$

where $\phi'_{bl}$ is the absolute azimuth of the target, and $\theta_{bl}$ is the absolute zenith angle of the target.

Calibration Procedures

Several calibration parameters must be determined experimentally. They are listed as the first set of items (1) through (4) in Table 2. Based on small angle approximations the systematic error in measured azimuth resulting from errors in the array center point and off zenith fisheye boresight is given by:

$$\Delta\phi = (\alpha_s \cos\phi_s + \beta_s \sin\phi_s)\frac{\cos\theta_s}{\sin\theta_s} - \frac{\Delta\theta_c}{\theta_s}\sin(\phi_s - \phi_c)$$

where $\Delta\phi$ is the error in the azimuth measurement, $(\phi_c, \Delta\theta_c)$ describes the azimuth and zenith angle on the error in center position, and the remaining parameters are described in Table 2. Notice for a fixed zenith angle, errors in boresight pointing may be corrected by the errors in center location. The expression may be rewritten in terms of an effective center point and divided into sensor row and column, $$\Delta x_c = \beta\theta\frac{\cos\theta}{\sin\theta}$$

$$\Delta y_c = -\alpha\theta\frac{\cos\theta}{\sin\theta}$$

The calibration procedure takes advantage of this property by determining the center location which minimizes the azimuth error (in the least squares since) for a series of measurements at a constant (or near constant for sun) zenith angle. The procedure is repeated for several zenith angles, and the results are plotted as a function of $$\theta\frac{\cos\theta}{\sin\theta}.$$

The slope of a linear least squares fit provides the axis pitch (or roll), and the intercept provides the offset in center column (or row).

Error Analysis

The following is an error analysis. It is based directly on the coordinate transformation equations detailed above, so it cannot be considered an independent check. The results are based on small value approximations. As a first approximation two axis values which add in quadrature phase (a cos x+b sin x) are simply combined in a single "average" term, and systematic errors (such as errors in determining the calibration parameters) are treated in the same manner as random errors (centroid measurement error, mechanical drift, inclinometer noise, etc).

An attempt is made to maintain consistent notation with the explanation of the coordinate transformation. For the simplified case with the inclinometer level, the variance in determining absolute azimuth is approximately:

$$\sigma_{\phi_{bl}}^2 = \sigma_{\phi_b}^2 + \sigma_{\phi_l'}^2 + \left(\left(\frac{1}{\theta_s}\right)^2 + \left(\frac{\overline{\alpha}_s}{\sin^2\theta_s}\right)^2\right)\sigma_{x_s}^2 +$$

$$\left(\frac{\overline{\alpha}_s}{\sin^2\theta_s}\right)^2\left(\left(\frac{\Delta x_e}{\Delta x}\theta_s\right)^2\right) + \sigma_{\alpha_s}^2 \cot^2\theta_s + \left(\frac{1}{\sin^2\theta_s}\right)^2\sigma_{\theta_x}^2$$

A brief summary of the terms is listed in Table 3.

TABLE 3

Summary of error contributions for leveled operation.

(1) $\sigma_{\phi_b}$ = error in boresight azimuth calibration
(2) $\sigma_{\phi_l'}$ = error in calculated sun location in ENU frame. Time, geo-location, and ephemeris errors are all believed to be negligible. Error for
(3) $\overline{\alpha}_s$ = average of fisheye boresight angular offset from inclinometer z-axis
(4) $\sigma_{x_s}$ = error in sun position on sensor (centroid accuracy based on radiometric SNR, gain variation, and image distortion). SNR contribution believed to be small (image ~3 pixels and camera gain, exposure time set to ~200 counts out of 255, noise measured <1 bit rms). Gain variation not measured. Image distortion, especially for large zenith angles is under investigation.

(5) $\frac{\Delta x_e}{\Delta x}$ = fractional error in pixel size (based on linear fisheye response, more generally $\left(\frac{\Delta x_e}{\Delta x}\right)\theta_s$ should be replaced as systematic error in measuring zenith angle). Response nonlinearity suspected problem. Correction under investigation.

(6) $\sigma_{\alpha_s}$ = error in determining fisheye boresight calibration parameters plus boresight drift (time/temperature). Fisheye boresight calibration long term repeatability under investigation.
(7) $\sigma_{\theta_x}$ = noise in inclinometer measurement.

If the device is permitted to pitch and bank, there is an additional error term which is proportional to the magnitude of the pitch and/or bank of:

$$\frac{\sigma_{\phi_{blin}}}{\theta_x} \approx \frac{1}{\sin^2\theta_s}\sqrt{\sigma_{x_s}^2\left(\left(\frac{\sin\theta_s\cos\theta_s}{\theta_s}\right)^2 + 1\right) + \sigma_{\alpha_s}^2(1 + \cos^4\theta_s) + \left(\left(\frac{\Delta x_e}{\Delta x}\right)\theta_s\right)^2}$$

Where a contribution from the boresight zenith angle relative to inclinometer zenith has been omitted (assumed negligible). The reader should note that this corresponds to an rms value instead of the variance shown for leveled operation. All of the error terms are the same as described in Table 3 with the exception of, $\sigma_{\theta x}$, the inclinometer measurement error. For pitched/banked operation, the inclinometer measurement error now includes not only noise, but any gain or nonlinearity contributions.

In addition to the error sources discussed above, the measurements will have two additional error sources. The first is the accuracy of the reference points. The second is pointing the Vector 21 (~1.2 mr reticule diameter). Current rough estimate is that these error sources are on the order of 0.5 mr rms.

Test data proving the accuracy of this embodiment utilized with the Victor 21 binoculars and with a theodolite is reported in parent patent application Ser. No. 12/283,785 which has been incorporated herein by reference.

Identification of Celestial Objects

Figure 2:
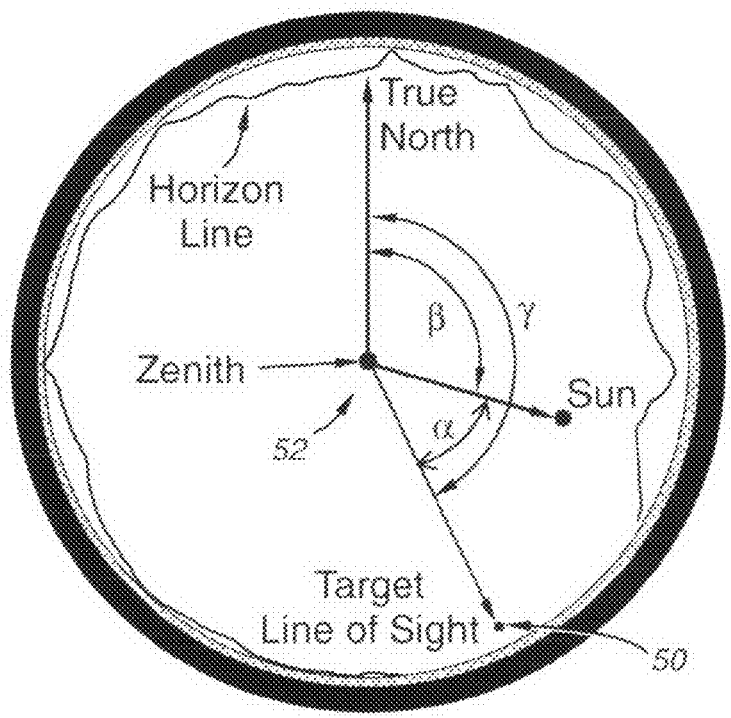
FIG. 2 is a drawing demonstrating how azimuth directions are determined with embodiments of the present invention.

FIG. 2 provides a simplified example of how an operator can use the Victor 21 prototype version of the present invention to determine the azimuthal direction to a target 50. The operator is located at a known latitude and longitude location 52 and the inclinometer in the Victor 21 determines the tilt of the binoculars relative to the Zenith at location 52. A camera 54 with a fisheye lens is shown in FIG. 1 is mounted on the binoculars and calibrated as described above. Each pixel of the camera sensor is calibrated so that the processor knows the azimuthal angle between each pixel of the sensor and the axis of the binoculars. To make an azimuthal determination of the direction to target 50 as shown in FIG. 2, the operator points the Victor 21 binoculars at target 50. The image of the sun will appear on the camera sensor at a location which deviates from the bore site of the binoculars by a known azimuthal angle based on a previous calibration procedure. The processor determines the location of the sun within the field of view of fisheye camera 54 and determines the centroid of the sun's image and the angle a between the centroid and the bore sight of the binoculars. Since the processor knows the correct time, it knows the azimuthal direction of the sun relative to true north. Therefore the processor calculates the azimuthal direction of the object by merely adding the angle α to angle β to determine the azimuthal angle γ to the target relative to true north. The operator then records the distance to the target using the Victor 21 range finder. The processor records the elevation angle to the target using the inclinometer. Since the operator knows his own geo-position at location 52 in latitude and longitude and elevation above sea level, he is able to precisely determine the geo-position of target 50 in latitude and longitude and elevation above sea level utilizing the azimuthal direction, the elevation angle to the target and the distance to the target.

Preferably, however the system is programmed to provide all of the above information automatically with the operator only having to point the binoculars at the target. As indicated above the processor in the prototype is programmed with a celestial shape and pattern recognition program so that the system computer has with the ability to recognize the sun, moon and bright stars and to automatically calculate the azimuth and elevation angles of targets using the positions of the stars and knowing the geo position of the system. Based on the shape, brightness, and the time of day, the computer can be easily programmed to recognize the sun and moon. In the case of stars, pattern recognition software is preferably used to identify the stars based on their relative spacing. Once the target is identified, additional software determines the orientation of the camera. Astronomical algorithms and celestial navigation software suitable for programming computer 22 is described and provided in several well-known texts including *Astronomical Algorithms* by Jean Meeus that is referred to in the Background Section. Once the camera orientation is known, the azimuth of the instrument is easily computed.

Boresighting the Module with Other Instruments

Calibration of the module with other optical instruments requires a single calibration. A target at a known azimuth is imaged by the other optical instruments at the same time that a celestial measurement is made. The azimuth reported by the celestial measurements is then rotated to agree with the other optical instruments.

Miniaturized Versions

Figure 4:
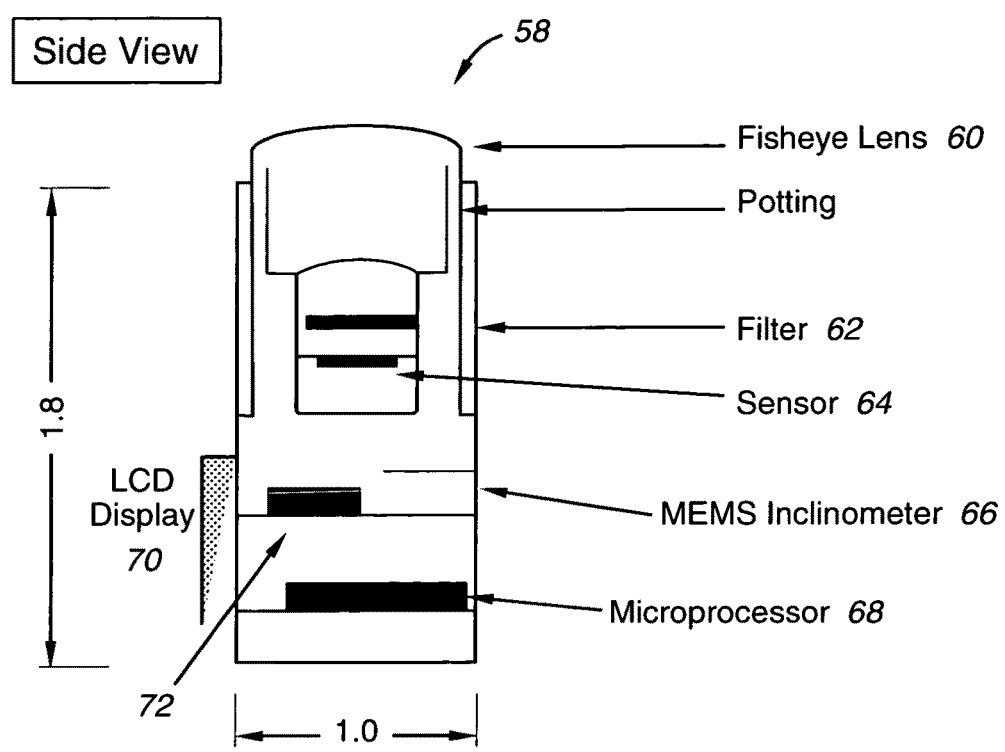
FIG. 4 shows a design of a one camera miniature version of the present invention.

Applicants have prepared designs for a miniaturization of the present invention. A preferred preliminary design is shown in FIG. 4. This figure shows dimensions and features. The module includes a single celestial camera with a fisheye lens 60 (Model DSL-215) available from Sunix, Inc with offices in Carlsbad, Calif., with a movable filter 62 for filtering sunlight for daytime operation. It also includes a 1280× 1024 pixel sensor 64 Model MTM001C12STM) available from Micron Technology Inc. with offices in Manassas, Va., a MEMS inclinometer 66 (Model ADIS16209) available from Analog Devices and a microprocessor 68 also available from Analog Devices (Model ADSP BF538). This is a tiny module measuring as indicated in FIG. 4 about 1.8 inches high and 1 inch in cross section. The unit includes a LCD display 70 and is powered by a ¼ watt battery 72.

Three-Camera Version

Figure 5:
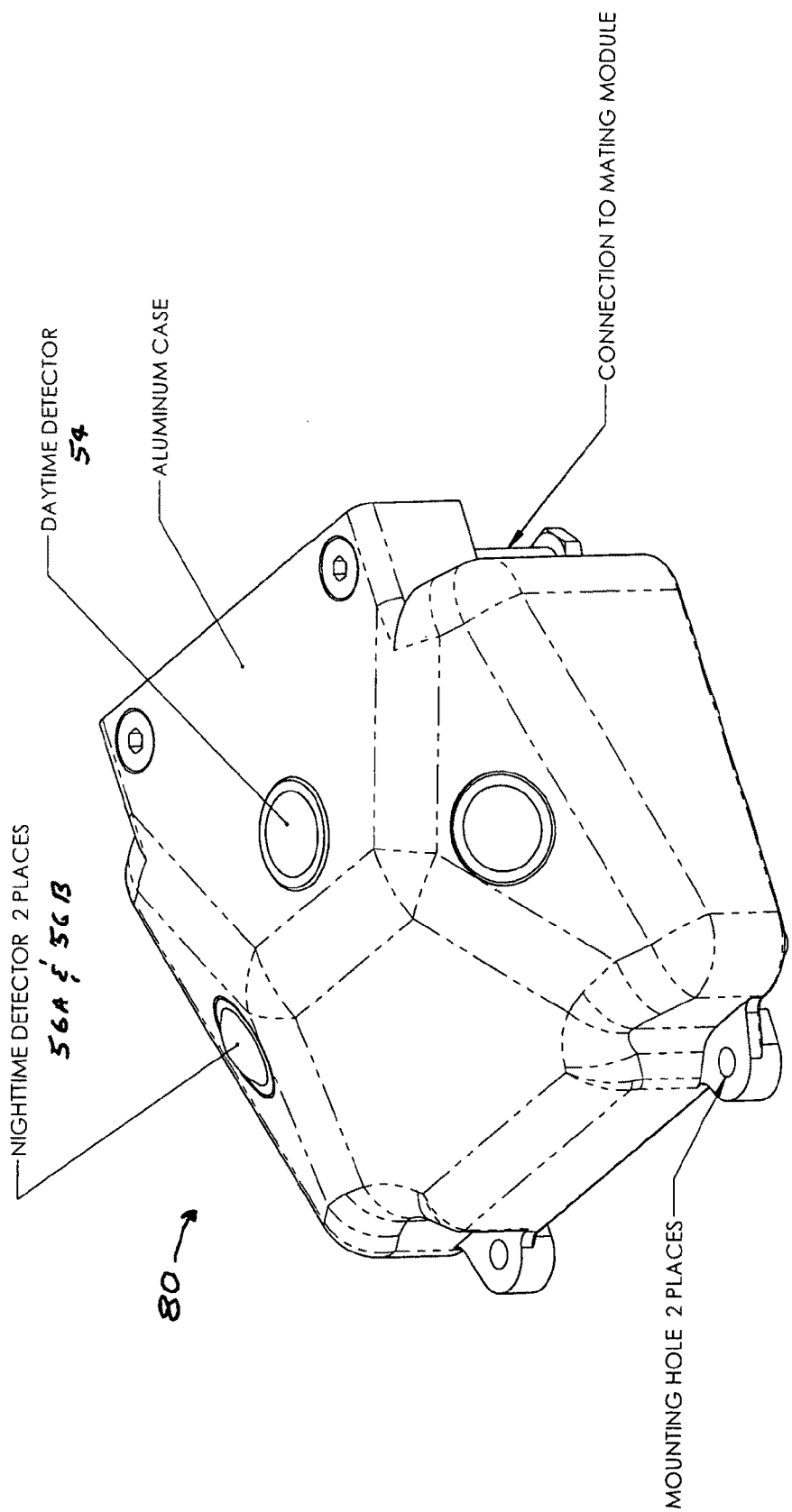
FIG. 5 is a drawing showing features of a three camera version of the present invention.

A three-camera version 80 of the present invention is shown in FIG. 5. This version includes a daytime camera with a fisheye lens pointed vertically and two nighttime cameras with fields of view of about 66 degrees pointed at angles of about 45 degrees with the vertical and 90 degrees with the binoculars boresight. The two cameras together provide a field of view including about 33 percent of the nighttime sky. In a preferred embodiment the three camera version also includes a microprocessor and a MEMS inclinometer as in the two-camera version. This embodiment as shown in FIG. 6 may be mated with a second module 81 that includes a GPS unit a digital magnetic compass and a three-gyroscope inertial measurement unit (not shown). The digital magnetic compass may be calibrated based on the more precise directional information available from the celestial information. In case of cloudy weather the digital magnetic compass can provide continuous directional information. The inertial measurement unit can also provide directional information during periods when the celestial information is not available and the digital magnetic compass information appears to be less reliable than that of the inertial measurement unit.

Challenges and Solutions of the Single Camera Embodiments

In order to measure the position of both the sun and stars, a very large dynamic range of $10^{11}$ to $10^{13}$ must be accommodated. For example, illuminance due to various sources is shown in Table 4. Assuming that the detector must be able to image the sun at its brightest and stars of $1^{st}$ magnitude, the illumination range is $10^{11}$. For imaging of the sun and $6^{th}$ magnitude stars, the range is $10^{13}$.

TABLE 4

| Illumination due to various sources (RCA Electro-Optics Handbook 1974). | |
|---|---|
| Source | Illumination (lux) |
| Sun at brightest | $1.24 \times 10^5$ |
| Sirius | $9.80 \times 10^{-6}$ |
| Zero Mag. Star | $2.65 \times 10^{-6}$ |
| $1^{st}$ Mag. Star | $1.05 \times 10^{-6}$ |
| $6^{th}$ Mag. Star | $1.05 \times 10^{-8}$ |

Exposure time and gain control generally provide for about $10^5$ range in illumination.

Two sensors could be used, but this would increase the cost, weight, and bulk of the system. Alternatively, a moving filter could be used to compensate for the remainder. However, moving parts are more likely to fail, and require the operator to make adjustments. Two alternative solutions have been developed by Applicants. To address the dynamic range issue, Applicants have developed two alternative strategies. The first is to place a checkerboard neutral density filter over the sensor, and thus essentially combine two sensors into one. For this concept to work, the anti-blooming suppression must greatly exceed that which can be implemented in CCDs. Charge injection devices (CIDs) have been shown to have superior anti-blooming suppression. The second alternative approach is to utilize a sensor with a very high dynamic range. Dynamic ranges of 100 dB to 140 dB are available. Some of these devices should be able to directly image both the sun and stars. Affordable models are becoming commercially available.

Checkerboard Approach

One solution is to place a filter of the required amount directly over the sensor in the form of a checkerboard. The dark or absorbing squares might cover single pixels or arrays of 4 or 9 pixels, for instance. The optically attenuated pixels would only be used for imaging the sun. The optically un-attenuated pixels would only be used for imaging stars. This scheme combines two separate sensors into one. However, a sufficient numbers of stars with adequate magnitude would be required in the field of view to overcome the fact that half of the sensor would be insensitive to stars. When imaging the sun, some of the optically un-attenuated pixels would be heavily saturated. If the saturation overflowed or "bloomed" to adjacent pixels, that would compromise the ability of the attenuated pixels to accurately image and centroid the sun. The question arises as to how well anti-blooming technology functions. Anti-blooming refers to suppression of electron diffusion from a given pixel well into adjacent wells. Another concern is diffusion of scattered photons around the edges of filters with large attenuation. To address these concerns, the anti-blooming capabilities of CCDs, CMOS, and CIDs were explored.

When a pixel is exposed to light and the well is filled with charge, the charge will begin to overflow to nearby pixels unless some type of anti-blooming is implemented. For CCDs there are three categories of anti-blooming:
 1. Charge pumping or clocked anti-blooming
 2. Lateral overflow drain
 3. Vertical overflow drain Charge pumped or clocked anti-blooming has a maximum capacity of about 50-100 times overexposure.

Overflow drains in each pixel are possible. They tend to produce a non-linear signal response for signals near saturation due to progressive loss to the drain. Lateral overflow drains occupy pixel real estate, and reduce fill factor. Vertical overflow drains refer to drains that physically lie underneath the pixel and therefore do not diminish the fill factor. However, the red and IR response is typically diminished with vertical drains because the longer wavelengths are deeper penetrating and a percentage is lost in the drain. The anti-blooming ability withstands brightness over several $10^5$ lux. There is an imaging sensor related to CMOS called a charge injection device or CID. These devices are known to have excellent anti-blooming capability.

Large Dynamic Range CMOS

Another solution to the problem of dynamic range is CMOS sensors with enormous dynamic range. These sensors are available, some at a reasonable cost. They have ranges of 100 dB-140 dB and some of them should be able to directly image both the sun and stars. One such camera is the Bci5 camera available from C-Cam Technologies. This camera has the same pixel count and frame rate as the current cameras, but a slightly larger pixel size. To further increase the dynamic range, a photo-chromic filter as utilized in ordinary eyeglasses could be added. These filters are capable of almost an order of magnitude variation in transmission. The filter would suppress transmission when imaging the sun, but exhibit maximum transmission when imaging stars.

Cloudy Weather

As indicated above in connection with the description of preferred embodiments. The primary components of the present invention cannot function as desired in cloudy weather or in similar situations when the celestial objects are not visible to the system's sensors. For these reasons many embodiments may be equipped with a backup digital magnetic compass. This magnetic compass can be calibrated periodically using the features of the present invention and can take over when the heavens are obscured. Alternatively or in addition a miniature attitude and reference system such as the systems discussed in the background section of this specification may be added to allow the target information to be determined in the event that clouds obscure the celestial objects. Also when systems of the present invention is located at a particular location the precise location to a local landmark can be identified by the system and utilized to provide reference directions later in the event of cloudy weather. To utilize this feature an additional camera may be required to assure that an appropriate local landmark is in the field of view of system camera.

APPLICATIONS OF THE PRESENT INVENTION

Embodiments of the present invention include in many applications where high accuracy directional equipment is needed such as for use in surveying, on cruise ships, fishing boats and private and commercial aircraft. The invention may also be utilized on robotic vehicles including unmanned aerial vehicles, unmanned marine vehicles and unmanned surface vehicles. A particular important use of the invention will be as a guidance and control feature for robotic vehicles designed for use in dangerous situations where accurate directional information is required. For example, in addition to the telescopic equipment the celestial camera and the MEMS mirror of the present invention, the robotic surveillance vehicle could be equipped with a GPS unit, and a backup digital magnetic compass and a camera for monitoring the field of view of the telescopic equipment. Communication equipment would be needed for remote control of the robotic vehicle. Utilizing features described in the embodiments described above dangerous targets could be identified and neutralized. Embodiments could include weapons for defense or even offence which could be operated remotely.

There are many variations to the above specific embodiments of the present invention. Many of these will be obvious to those skilled in the art. For example in many embodiments focal plane arrays with only about 350,000 pixels will be adequate. Preferably time should be accurate to at least three seconds and the location of the systems should be known accurately to at least within two kilometers when using the system for direction only. For pinpointing accurately a target with embodiments including a range finder the system location should be known much more accurately such as within a very few meters or less since any error in the system location is going to be translated directly to the an error in the target location. So the scope of the present invention should be determined by the appended claims and their legal equivalence.

What is claimed is:

1. A target location system comprised of:
    A) a telescopic range finder comprising a telescopic instrument bore-sighted with a range finder, B) a miniature celestial direction detection system comprising:
C) at least one camera for viewing a large portion of sky, said camera comprising:
 1) a wide angle lens and
 2) a sensor having a focal plane array of at least about 350,000 pixels; and
D) a MEMS inclinometer and
E) a microprocessor programmed with:
 1) an astronomical algorithm for defining locations of celestial objects based on known time,
 2) coordinate transformation software for converting pixel image software into astronomical coordinates,
 3) software to synchronize the processor with an Internet time source accurate to within 3 seconds and to provide system GPS location of the system accurate to within 5 meters or less corresponding to precision needed for identification of a target location;
 4) software adapted to compute location of the target based on the system location and direction and range information provided by components of the system.

2. The celestial direction detection system as in claim 1 wherein the wide angle lens is a fisheye lens.

3. The celestial direction detection system as in claim 1 wherein said location is provided in terms of latitude and longitude.

4. The celestial direction detection system as in claim 3 wherein the time signal is a time signal transmitted by NIST.

5. The celestial direction detection system as in claim 1 wherein said location is provided in terms of latitude, longitude and elevation.

6. The celestial direction detection system as in claim 1 wherein identification is in terms of latitude, longitude and elevation of the target.

7. The celestial direction detection system as in claim 1 wherein said at least one camera is a single camera.

8. The celestial direction detection system as in claim 7 wherein said single camera defines an optical path and comprises a filter and a means for removing the filter from the optical path.

9. The celestial direction detection system as in claim 7 wherein said single camera comprises a checkerboard filter adapted to permit said camera to images the sun in daytime and stars at nighttime.

10. The celestial direction detection system as in claim 7 wherein said camera is adapted to provide a dynamic range of $10^{11}$.

11. The celestial direction detection system as in claim 1 wherein said system is installed on a robotic vehicle.

12. The celestial direction detection system as in claim 11 wherein said robotic vehicle is adapted for surveillance.

13. The celestial direction detection system as in claim 11 wherein said robotic vehicle comprises at least one weapon.

14. The celestial direction detection system as in claim 1 wherein said telescopic instrument is a telescope.

15. The celestial direction detection system as in claim 1 wherein said telescopic instrument is binoculars.

16. The celestial direction detection system as in claim 15 wherein said binoculars are gyro stabilized.

17. The celestial direction detection system as in claim 1 wherein said system is mounted directly or indirectly on a tripod.

* * * * *